United States Patent [19]

Haartsen

[11] Patent Number: 5,699,367
[45] Date of Patent: Dec. 16, 1997

[54] CONCATENATED ERROR DETECTION CODING AND PACKET NUMBERING FOR HIERARCHICAL ARQ SCHEMES

[75] Inventor: Jacobus Haartsen, Staffanstorp, Sweden

[73] Assignee: Telefonaktiebolaget LM Ericsson, Stockholm, Sweden

[21] Appl. No.: 581,111

[22] Filed: Dec. 29, 1995

[51] Int. Cl.$^6$ ....................................................... H04L 1/18
[52] U.S. Cl. ........................................................... 371/33
[58] Field of Search ......................................... 371/32, 33

[56] References Cited

U.S. PATENT DOCUMENTS 5,570,367  10/1996  Ayanoglu et al. .................... 370/94.1

FOREIGN PATENT DOCUMENTS 193 091     9/1986  European Pat. Off. .
695 053 A2  1/1996  European Pat. Off. .
695 053 A3  2/1997  European Pat. Off. .

OTHER PUBLICATIONS

M.J. Miller, "Error Control Techniques for Integrated Services Packet Networks," *IEEE Journal on Selected Areas in Communications*, vol. 7, No. 5, 690–697, Jun., 1989.
K. Mase et al., "Go–Back–N ARQ Schemes for Point-to-Multipoint Satellite Communications," *IEEE Transactions on Communications*, vol. COM–31, No. 4, pp. 583–589, Apr., 1983.

A. Bhargava et al., "Performance Comparison of Error Control Schemes in High Speed Computer Communication Networks," *IEEE INFOCOM '88—The Conference on Computer Communications Proceedings, Seventh Annual Joint Conference of the IEEE Computer and Communications Societies–Networks: Evolution or Revolution?*, pp. 694–703, Mar., 1988.

"Data Overlap Architecture," *IBM Technical Disclosure Bulletin*, vol. 34, No. 2, pp. 195–197, Jul. 1991.

DeSimone et al., "Throughput Performance of Transport \-Layer Protocols over Wireless LANs", *GLOBECOM '93*, Dec. 1993, pp. 542–549, Dec. 1993.

Paul et al., "An Asymmetric Protocol for Digital Cellular Communications", *INFOCOM '95*, Apr. 1995, pp. 1053–1062.

*Primary Examiner*—Stephen M. Baker
*Attorney, Agent, or Firm*—Burns, Doane, Swecker & Mathis, L.L.P.

[57] ABSTRACT

A retransmission method is disclosed wherein retransmissions over the sensitive link of the connection only involves packets that were actually disturbed in the sensitive link. At the same time, required storage capacity in the relay stations connecting the sensitive link to the nonsensitive link is reduced. Errors occurring in the sensitive part of the connection will cause retransmission over nonsensitive links of the connection as well, but this is considered to be of less importance since the nonsensitive links have a high throughput and/or low costs.

11 Claims, 5 Drawing Sheets

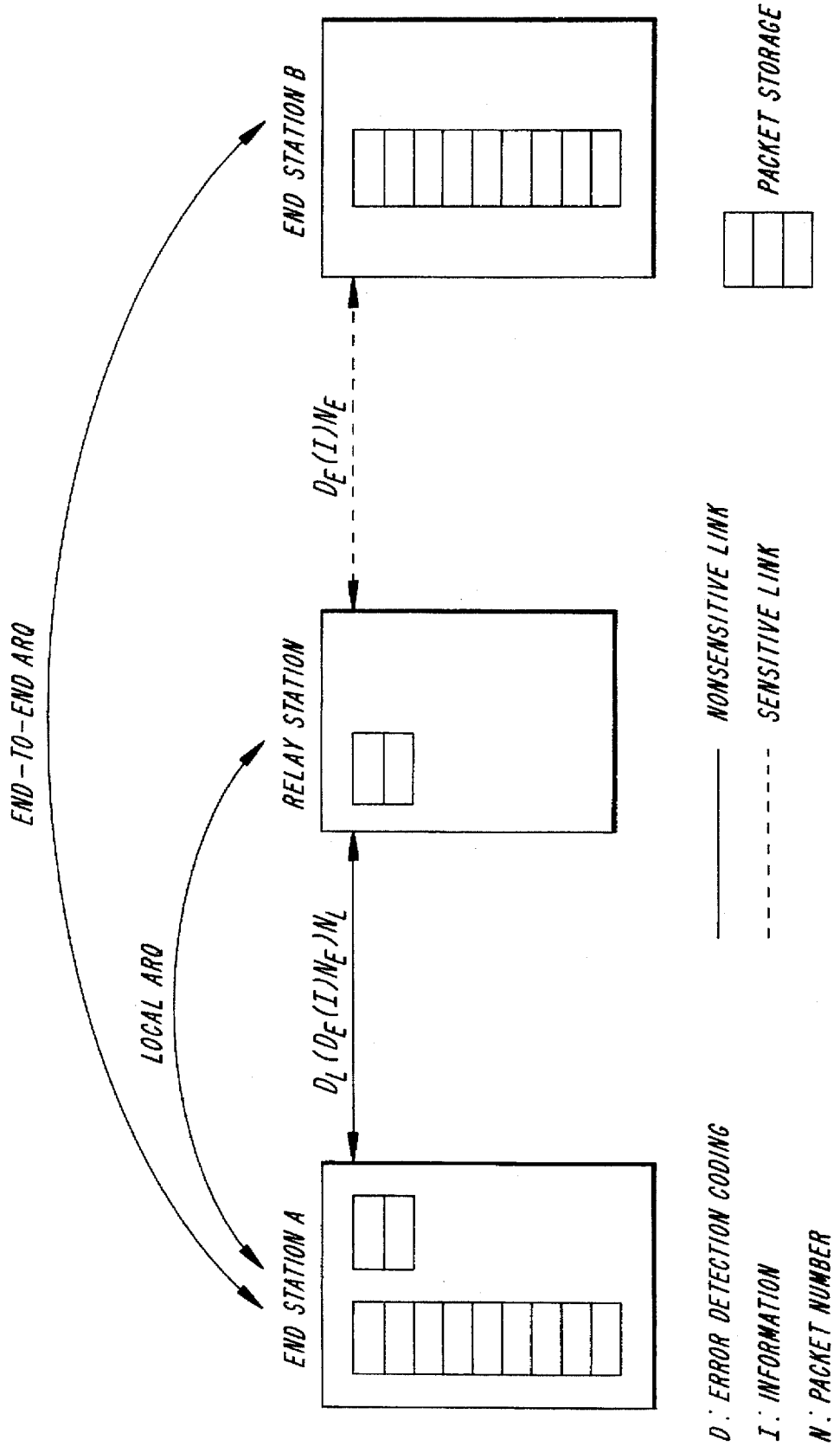

CONCATENATED ERROR DETECTION CODING AND PACKET NUMBERING FOR HIERARCHICAL ARQ SCHEMES

FIELD OF THE DISCLOSURE

The present invention relates to packet data transmission over a chain of cascaded links that makes use of packet retransmission for error correction. In particular, the present invention relates to packet data transmission over cascaded links that have different properties with respect to transmission costs per packet, transmission quality, transmission rate, and/or traffic density. Examples of such cascaded transmission links are portable computing devices (laptop, organizer, PDA) that are wirelessly connected (e.g. via a radio connection) to a mobile or portable phone which is further connected via radio link to a cellular network. Another example is cordless or wireless local area networks LAN, where a computing device is wirelessly connected to a fixed hub or satellite station that is connected to a wired LAN structure (Ethernet).

BACKGROUND OF THE DISCLOSURE

High capacity data transmission makes use of packet-switched networks in which data is conveyed in data packets which, in addition to the information, carry the addresses of the source and the destination. When a packet is disturbed, for example by a collision with another packet or by an increase in the interference level, the packet has to be retransmitted by the source. The source has to retransmit the same packet until a successful transmission is accomplished which is indicated by an acknowledgement from the destination that the packet has been received correctly. For the destination to be able to determine whether a packet has been correctly received, error detection coding is added to the packet, either in the form of forward-error-correction (FEC) coding or in the form of a cyclic redundancy check (CRC).

There exist several schemes that provide an automatic retransmit when the destination does not acknowledge receiving a packet, the so called ARQ (Automatic Repeat Query) methods. If the packet is not acknowledged within a certain period of time, the source automatically repeats the transmission. In its simplest form, the source waits for an acknowledgement from the destination after every packet transmission, and keeps periodically retransmitting this same packet until an acknowledgement is received. Only after the acknowledgement is received is the next packet transmitted. This is called the stop-and-wait ARQ method.

More efficient methods continue to transmit packets even if their predecessors have not yet been acknowledged. Packets that have not been acknowledged are stored for retransmission, and are only then deleted from the storage when they have been acknowledged. In these methods, the packets are provided with a packet number so that the destination can acknowledge the correct packet numbers. Examples of ARQ methods that use packet numbering and do not wait for an acknowledgement before they transmit the next packet are selective ARQ and (cumulative) go-back-N ARQ. These methods provide higher throughputs especially on connections which contain a certain amount of delay.

Most data communication is not carried over a homogeneous connection but over a chain of cascaded links that are connected by relay stations. Very often, the individual links have different characteristics, and one link can be more sensitive than the others with respect to cost (public wired and cellular networks versus local, private networks), data rate, or transmission quality (which may be related to the traffic density). One example of such a cascaded connection is the connection between a cellular base station and a portable computing device, that uses a short-range wireless connection to the cellular phone to access the cellular base station. Here, the cellular link is the most sensitive link. Another example is a portable computing device that is wirelessly connected to a Local Area Network (LAN) that connects to a server. In this example, the sensitive link is the wireless link between the computer and the wired LAN. Over these cascaded connections, an end-to-end ARQ protocol (ARQ between the source and destination only; the relay stations only relay the information without checking whether the information is correct) is not attractive, since if errors occur, retransmissions are required over the entire chain irrespective of the location where the errors occurred. In order to minimize the retransmission over the sensitive link, one would preferably only retransmit packets over the sensitive link that really were disturbed on the sensitive link. This requires distributed ARQ schemes, i.e., separate ARQ schemes at each link. In order to optimize throughput, extensive storage capabilities in the relay stations are now required in order to support the efficient ARQ methods.

SUMMARY OF THE DISCLOSURE

According to one embodiment of the present invention, a method is disclosed that minimizes retransmissions over the sensitive link, but at the same time combines a high throughput with low storage requirements in the relay stations. It is a combination of an end-to-end and a distributed ARQ protocol.

The present invention discloses a method in which retransmissions over the sensitive link of the connection only involves packets that were actually disturbed in this sensitive link. At the same time, required storage capacity in the relay stations connecting the sensitive link to the non-sensitive link is reduced. Errors occurring in the sensitive part of the connection will cause retransmission over non-sensitive links of the connection as well, but this is considered to be of less importance since the nonsensitive links have a high throughput and/or low costs.

According to one embodiment of the present invention, concatenated error detection coding and packet numbering are used. An end-to-end ARQ protocol is applied between two end stations that are connected via the sensitive link and at least one nonsensitive link. The end stations have sufficient processing power and storage capability to do the end-to-end protocol. Nonsensitive links in between the end stations apply their own "local" ARQs that regard the packet with end-to-end coding and number as a new information packet to which they add their own local error detection coding and number. Therefore, the local ARQ protocol encapsulates the end-to-end ARQ protocol, and a concatenation of error correction coding and numbering results. A packet carried over the sensitive link only contains the end-to-end coding and numbering. However, a packet carried over a nonsensitive link in addition contains the local coding and numbering. A relay station between the nonsensitive and sensitive link that receives a packet from the nonsensitive link, checks the correctness of the received packet using the local error detection coding. When the relay station determines that the packet has been correctly received, the relay station acknowledges the local number. The relay station then strips off the local coding and number and relays the packet to the sensitive link. If the packet has not been received correctly in the relay station, it is neither acknowledged nor is it relayed onto the sensitive link. When the relay station receives a packet from the sensitive link, the relay station does not check the correctness of the received packet, but directly adds the local coding and number, and then relays the packet to the nonsensitive link. In the end station which acts as the destination, first the local error detection coding is checked. If OK, the local number is acknowledged to the relay station. Then the end-to-end protocol is carried out to see if the packet also passed the sensitive link error-free. If the packet has not been correctly received, reception of the packet is not acknowledged and the other end station which acts as the source retransmits the packet. Once the packet has been correctly received, the destination acknowledges receipt of the packet by acknowledging the end-to-end packet numbering to the source.

BRIEF DESCRIPTION OF THE DRAWINGS

These and other features and advantages of the present invention will be readily apparent to one of ordinary skill in the art from the following written description, used in conjunction with the drawings, in which:

FIG. 5 illustrates a concatenated ARQ protocol according to one embodiment of the present invention.

DETAILED DESCRIPTION OF THE DISCLOSURE

Transmission connections rarely consist of a homogeneous link. Usually, transmission connections consist of a chain of cascaded links, where each individual link has its own characteristics with respect to throughput (data rate and link quality), and the costs of transmission.

Data communications usually applies packetizing techniques to convey the data. The data is collected to form a packet which may have some overhead information like source and destination addresses, priority delivery, and an ordering number. In addition, some form of error detection coding, e.g. cyclic-redundancy-check CRC or forward-error-correction FEC, is added so that the destination can identify whether the packet has been correctly received. The packets can then be sent synchronously or asynchronously over the link. The destination checks the correctness of the packet and either sends an acknowledgement signal (ACK) with the packet number or a non-acknowledgement signal (NAK) in case the packet has been correctly or incorrectly received, respectively. When a non-acknowledgement signal is produced, the source can respond with a retransmission of the incorrect packet. In many systems, however, non-acknowledgement signals are not used. Instead, the source waits during a time-out period and if an acknowledgement signal is not received within the time-out period, the source automatically retransmits the packet. This so-called Automatic Repeat Query (ARQ) or Automatic Repeat Request is more secure than the use of non-acknowledgement signals, because if an acknowledgement signal gets disturbed, the source retransmits the packet, however, when a non-acknowledgement signal gets disturbed, some information may never correctly reach the destination. Note that acknowledgement messages do not have to be returned separately, but can be embedded in the return data flow, so-called piggy-back rides.

There are several forms of ARQ schemes. In the most simple method, the source transmits only one packet and then waits for an acknowledgement for that packet. The same packet is retransmitted periodically until it is acknowledged. This STOP-AND-WAIT ARQ method is not very efficient, especially when there is a considerable delay in the connection or in the destination's processing. An ARQ method with a higher throughput rate transmits packets continuously, but stores the transmitted packets until they are acknowledged. After a packet has been acknowledged, the packet is deleted from the stored list of packets. If the packets are not acknowledged within a time-out period, they are retransmitted.

Figure 1:
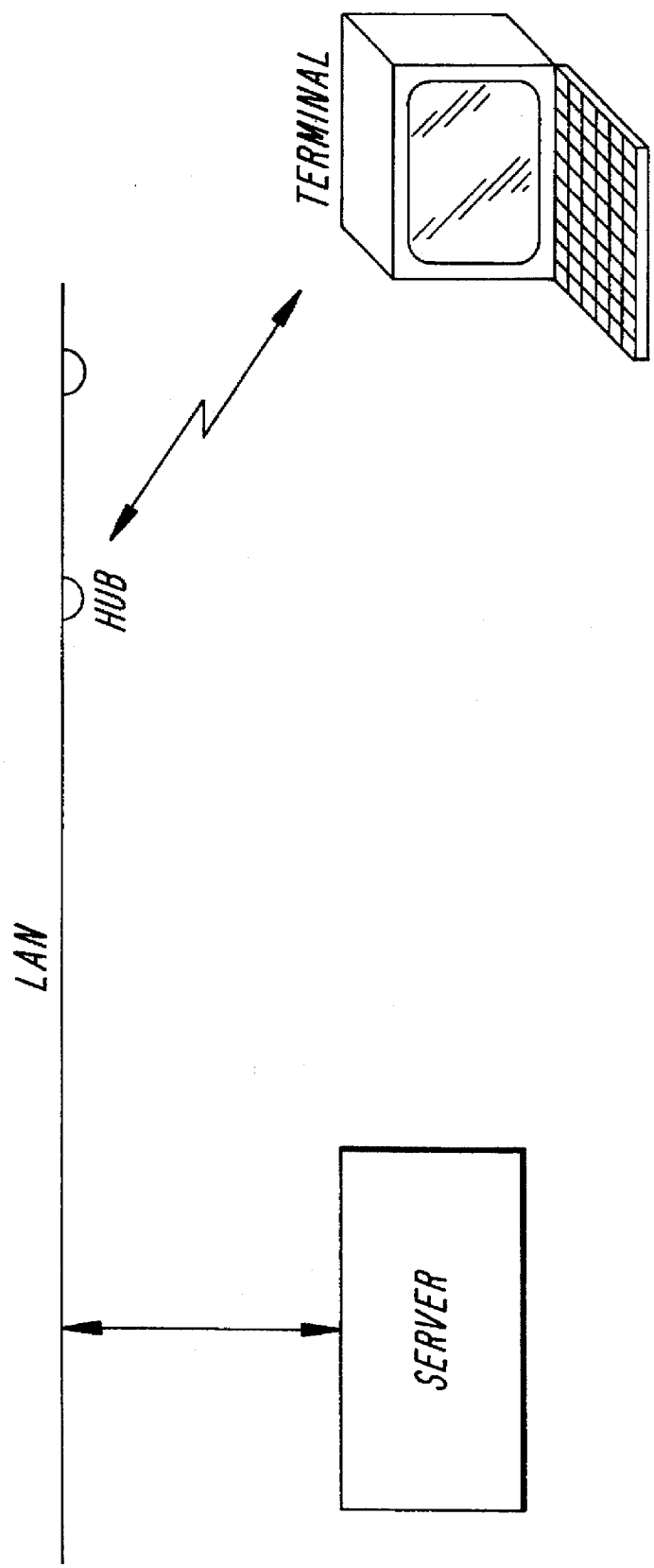
FIG. 1 illustrates packet transmission over cascaded connections in a local area network.
Figure 2:
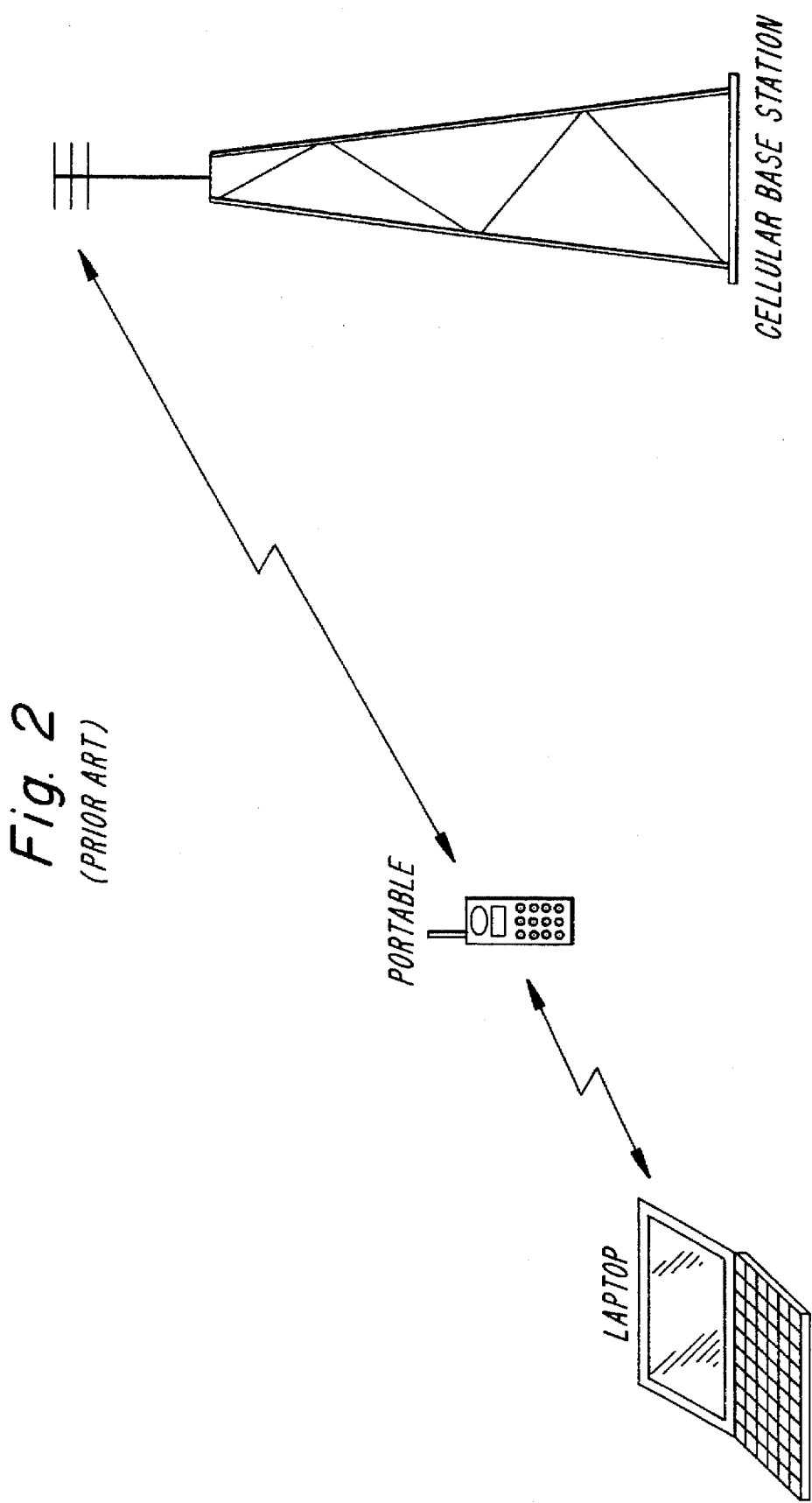
FIG. 2 illustrates packet transmission over cascaded connections between a laptop and a cellular system through a short range RF connection to a cellular phone.

The present invention relates to how these ARQ protocols are used on a chain of cascaded links or connections. Two examples of these kinds of connections are illustrated in FIGS. 1 and 2. In FIG. 1, a wireless local area network LAN is shown. A server is connected to a wired LAN, whereas a portable computer is connected to the same wired LAN via a radio link. The radio link is the sensitive link in this example, since it has a lower throughput (lower data rate, lower quality thus more retransmissions). The server and the portable computer are the end stations in this example. The hub acts as a relay station between the radio link and the wired LAN and can serve several portable computers. In FIG. 2, a portable data device such as a laptop, PDA, organizer, etc., is connected via a short-range RF connection to a cellular phone which is connected to the cellular network via a radio link. In this example, the cellular link is the sensitive link with respect to throughput (data rate and signal quality) and air-time costs. The cellular base station (or the interworking unit connected to the base station) and the data device act as end stations, whereas the cellular phone acts as a relay station. Because of the reduced throughput and/or costs, errors occurring in either the wired LAN (a) or the short-range RF link (b) should not induce retransmissions over the sensitive links.

Figure 3:
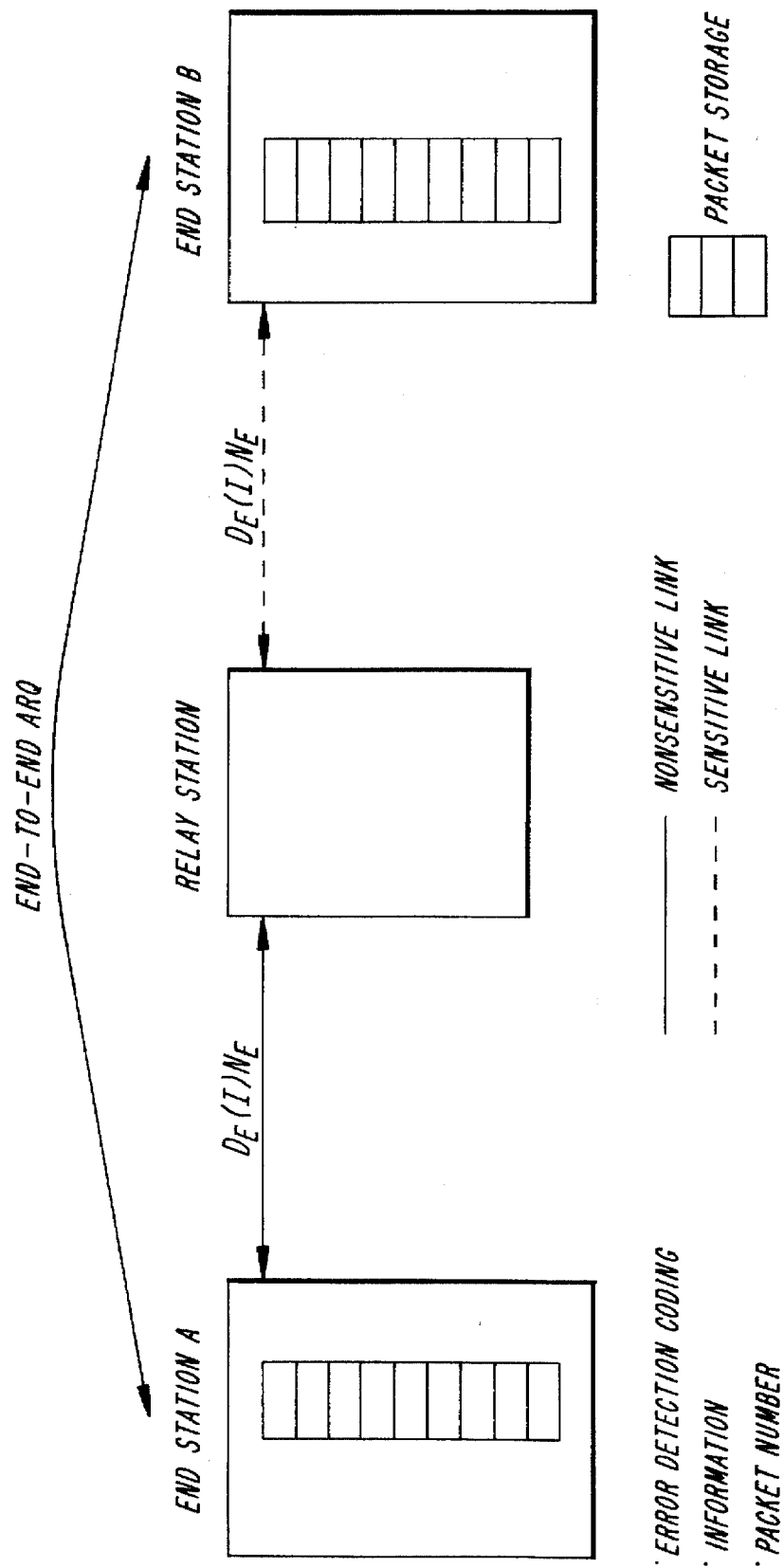
FIG. 3 illustrates an end-to-end ARQ protocol.
Figure 4:
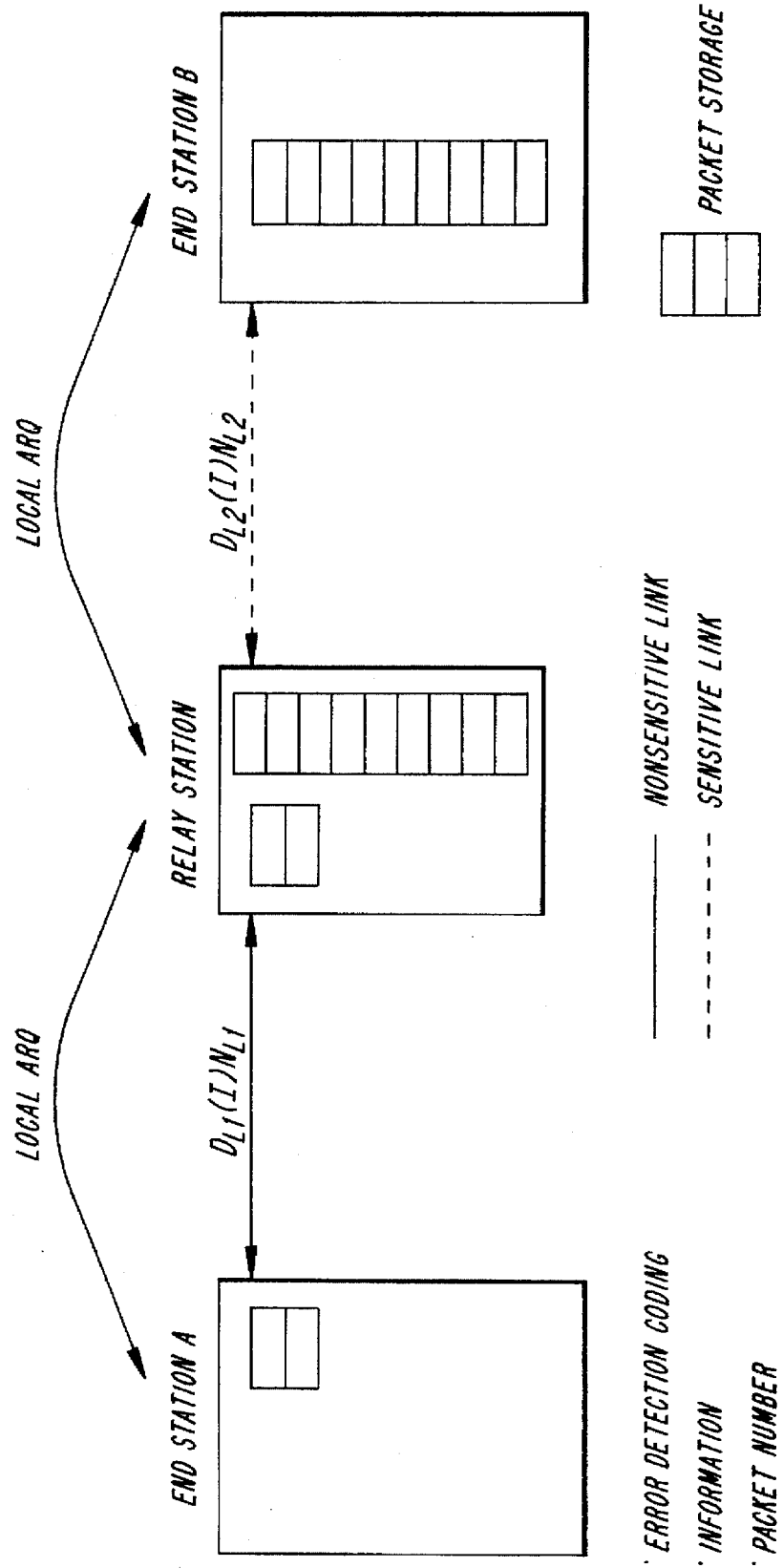
FIG. 4 illustrates a distributed ARQ protocol.

ARQ protocols provides error correction by retransmission in the above-described communications systems. A straight-forward ARQ method uses an end-to-end protocol that checks the packets at the end stations only, as illustrated in FIG. 3. In FIG. 3, the dashed-line represents the sensitive link. The storage capacity required for the end-to-end ARQ protocol is only encountered in the end stations. The relay station merely has to relay the information from one link to the other without doing anything with the packets. This ARQ protocol is not attractive in the above-mentioned applications, because errors in the nonsensitive link will induce end-to-end retransmissions, involving the sensitive links as well. This disadvantage can be avoided by applying a distributed ARQ protocol as shown in FIG. 4. In a distributed ARQ protocol, the sensitive and nonsensitive links each have their own ARQ protocol. Retransmissions only take place in the link on which the errors have actually occurred. However, as indicated in FIG. 4, the relay station now has to be able to carry out two local ARQ protocols, including the storage of the frames for retransmissions. For the nonsensitive link, this is not such a problem. Since its throughput is high and the round-trip delay is small, the buffer requirements are limited since the higher throughput and the shorter delay before acknowledgment requires less buffering. For the sensitive link however, more elaborate storage capabilities are required. However, in a wired LAN system, which serves a number of portable users simultaneously, and in a portable phone, the extra storage requirements and end-protocol processing are not attractive. In FIG. 4, this difference in storage capacity for the two ARQ methods is indicated by the difference in size of the memories. In FIGS. 3–5, the packet characteristics are specified with the capital letters I, D and N, where I is the information packet, D is the added data for error detection, and N is the packet number. In FIG. 3, only one packet type existed which included the end-to-end error coding D_E and number N_E, wherein _E denotes that the error detection coding D and the number N are part of the end-to-end protocol. In FIG. 4, there are two local protocols, producing a D_L1, N_L1, and a D_L2, N_L2 for two local ARQs, wherein _L denotes that the error detection coding D and the number N are part of the local protocol. In FIG. 4, it was assumed that the packet length was the same on both links. This is not a prerequisite, and link 1, for example, could well have carried D_L1 (I1) N_L1, D_L1 (I2) N_L1, . . . , D_L1 (In) N_L1 if the packet of link 2 was broken up into n packets for link 1.

According to one embodiment of the present invention, the relay station complexity can be reduced by only applying a local ARQ method for the nonsensitive link. In such a method, only a small amount of storage is required. This can be achieved by encapsulating the end-to-end ARQ protocol by the local ARQ protocol, as illustrated in FIG. 5. In addition to an end-to-end protocol between the two end stations, a local ARQ protocol is used over the nonsensitive link. Packets of the end-to-end protocol are regarded as normal data for the local ARQ protocol and given additional error detection coding and numbering. If the end station A wants to transmit an information packet I, it adds the error detection coding D_E and the number N_E of the end-to-end protocol, resulting in a packet D_E (I) N_E. Now the local ARQ protocol adds a second layer with error detection coding D_L and the number N_L to produce a packet D_L (D_E (I) N_E) N_L. When the relay station receives this packet, first the error detection coding D_L is checked to see whether the local link produced any errors. If the packet has been correctly received, the local number N_L is acknowledged to station A. The relay station then strips off the local ARQ overhead (i.e., D_L and N_L) from the packet, and the packet is relayed to the sensitive link. If the packet is not correctly received, the local number N_L is not acknowledged, nor is the packet relayed to the sensitive link. The packet is then retransmitted by station A locally over the nonsensitive link until the packet is correctly received and acknowledged by the relay station.

When the relayed packet is received by end station B, the packet's correctness is checked using the error detection coding D_E. Only errors on the sensitive link could have affected this packet, otherwise the packet would not have been relayed. The end-to-end protocol packet number N_E is then acknowledged to station A if the packet has been received correctly. If the packet has not been received correctly, it must be retransmitted over the entire connection. However, because the local link is a nonsensitive link with a high throughput, this extra traffic is not a problem for the non-sensitive link.

A packet transmission in the opposite direction will now be described. The end station B takes an information packet I and adds the end-to-end protocol error detection coding D_E and numbering N_E to produce D_E (I) N_E. Then the coded packet is sent through the sensitive link to the relay station. The relay station does not check if the packet has been received correctly. The packet is taken as it is and a second layer of error detection coding D_L and numbering N_L is laid around the packet to produce D_L (D_E (I) N_E) N_L. On receipt of the packet, the end station A first checks whether the packet passed the last, local link correctly by checking the error detection coding D_L. If the error detection coding is correct, the end station A acknowledges the (local) packet reception to the relay station by acknowledging N_L.

If packet number N_L is not acknowledged, the packet is retransmitted, but only by the relay station. If the error detection coding D_L is correct, the end station A takes the next ARQ layer and checks the end-to-end protocol error detection coding D_E. If the error detection coding D_E is correct, it is clear that the packet passed the entire connection correctly, and its reception can be acknowledged by acknowledging the number N_E to the end station B. If the error detection coding D_E is not correct, apparently an error occurred in the sensitive link, and the end packet number N_E is not acknowledged. As a result, the end station B retransmits the packet until the packet is acknowledged by the end station A.

In another embodiment of the present invention, the relay station checks the error detection coding D_E in the packet it receives from the end station B. It discards the packet when an error is detected, thus reducing the traffic on the nonsensitive link. However, the extra overhead in sending incorrect packets over the high-throughput link is not such a problem, whereas an end-protocol error check in the relay station might unnecessarily burden the relay station.

It is true that the relay station still has to have storage and processing power to do the local ARQ scheme. However, because of the higher throughput on the local links, the buffer and processing requirements are much smaller for the local ARQ than for the end-to-end ARQ. In addition, since the local ARQ is embedded in the end-to-end ARQ, any errors undetected in the local procedure will be caught by the end-to-end procedure. It will be understood that this extra security should be used as little as possible in order to minimize the extra retransmissions over the sensitive link. However, the nonsensitive link does not have to be completely error-free, which simplifies the local ARQ implementation even more. One possible expansion on this basic method is a system in which the end-to-end packet is divided into smaller subpackets which are each locally coded and numbered and then transmitted at a high rate through the local link. In the relay station, the subpackets are collected and assembled into a single packet that is then transmitted over the sensitive link. Still another expansion on the basic method is a system where several end-to-end packets are collected and assembled into a large packet, which is then locally coded and numbered. This large packet is then transmitted through the local (non-sensitive) link. In the relay station, the correctly received assembled packet is disassembled into the original end-to-end packets, which are then individually relayed to and transmitted over the sensitive link.

The encapsulation procedure can be continued if there are more cascaded and sensitive links. Each time, a new shell of ARQ information is built around the former packet. For a new encapsulation, the entire packet (information+coding+number) is considered as a new information packet. In this way, a hierarchy of ARQ schemes is created, and the overhead for the individual ARQ schemes lie as layers or shells around the packet. By peeling off the ARQ overhead one by one, the processing station can determine where the error occurred and to which (relay) station the packet can be acknowledged.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method for minimizing retransmissions of packets between two end stations, comprising the steps of:

dividing information into numbered packets;

error detection coding said packets using a first code at a first end station;

transmitting said packets to a relay station using a sensitive link;

storing said coded packets in a memory in said relay station;

local error detection coding and numbering said received packets;

transmitting said packets to a second end station using a non-sensitive link;

decoding the local error detection code of said packet and acknowledging receipt if the local coding is correctly decoded; and decoding said first error detection code and sending an acknowledgement to said first end station when the first error detection code is correctly decoded.

2. A method for minimizing retransmissions of packets between two end stations according to claim 1, further comprising the step of:

retransmitting said packet from said relay station to said second end station when said relay station does not receive an acknowledgement within a predetermined period of time after transmitting said packet.

3. A method for minimizing retransmissions of packets between two end stations according to claim 1, further comprising the step of:

retransmitting said packet from said first end station when said first end station does not receive an acknowledgement within a predetermined period of time after transmitting said packet.

4. A method for minimizing retransmissions of packets between two end stations according to claim 1, further comprising the step of:

decoding the first error detection code at said relay station and acknowledging receipt of the packet when the first error detection code is correctly decoded.

5. A method for minimizing retransmissions of packets between two end stations according to claim 1, wherein said acknowledgements use said numbering.

6. A method for minimizing retransmission of packets between two end stations, comprising the steps of:

dividing information into at least one numbered packet;

error detection coding said packet using a first code at a first end station;

error detection coding said packet using a local code and numbering said packet using a local number;

transmitting said coded packet to a relay station over a non-sensitive link;

decoding said local error detection coding of said received packet and acknowledging receipt of said packet if the local error detection code is correctly decoded;

stripping off said local error detection coding and said local number from said decoded packet;

transmitting said stripped packet to a second end-station over a sensitive link;

decoding said first error detection code and acknowledging receipt of said packet if the first error detection code is correctly decoded.

7. A method for minimizing retransmission of packets between two end stations according to claim 6, further comprising the step of:

retransmitting said packet from said first end station to said relay station when said first end station does not receive an acknowledgement within a predetermined period of time after transmitting said packet.

8. A method for minimizing retransmission of packets between two end stations according to claim 6, wherein said acknowledgements use said numbering.

9. A method for minimizing retransmission of packets between two end stations over a plurality of links and a plurality of intermediate relay stations, comprising the steps of:

dividing information into numbered packets;

error detection coding said packets using a first code at a first end station;

transmitting said packets to a second end station over a plurality of links connected by a plurality of intermediate relay stations, wherein each relay station adds a different local error detection coding and numbering to the received packet, and each relay station decodes a local error detection code and strips off the decoded error detection code from the received packet and sends an acknowledgement to the relay station which last sent the packet when the local detection code is correctly decoded for only packets received over a non-sensitive link;

decoding local error detection codes of said packet and acknowledging receipt to the appropriate relay station when the local error detection code is correctly decoded; and decoding said first error detection code and sending an acknowledgement to said first end station when the first error detection code is correctly decoded.

10. A method for minimizing retransmissions of packets between two end stations according to claim 9, further comprising the step of:

retransmitting said packet from one of said relay stations to said second end station when said relay station does not receive an acknowledgement within a predetermined period of time after transmitting said packet.

11. A method for minimizing retransmissions of packets between two end stations according to claim 9, further comprising the step of:

retransmitting said packet from said first end station when said first end station does not receive an acknowledgement within a predetermined period of time after transmitting said packet.

* * * * *